E. E. MARSHALL.
SEED GERMINATOR.
APPLICATION FILED MAR. 13, 1913.
1,130,752.
Patented Mar. 9, 1915.
2 SHEETS—SHEET 2.
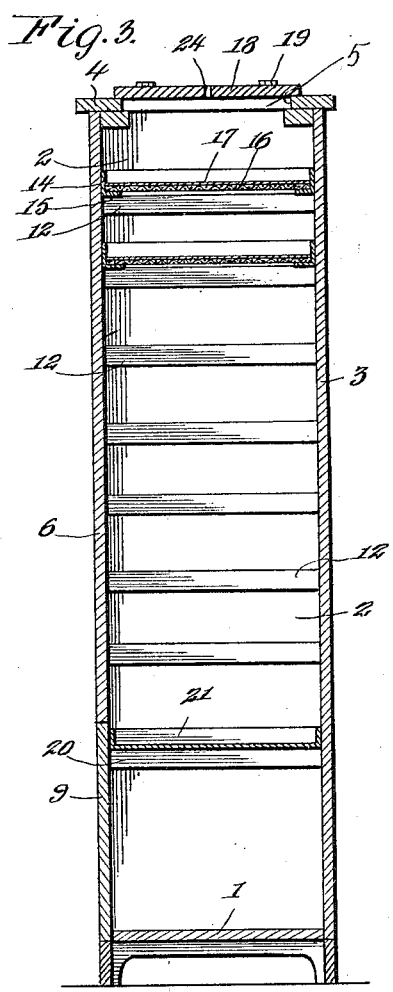
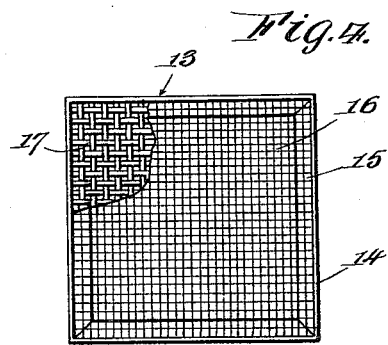
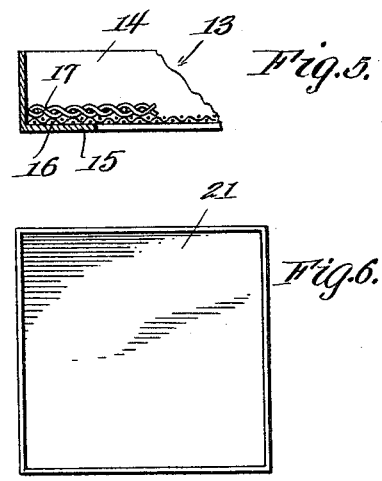
WITNESSES
G. M. Spring.
Wm. E. Valk Jr.
INVENTOR
Elmer E. Marshall,
by Richard Owen
his Attorney

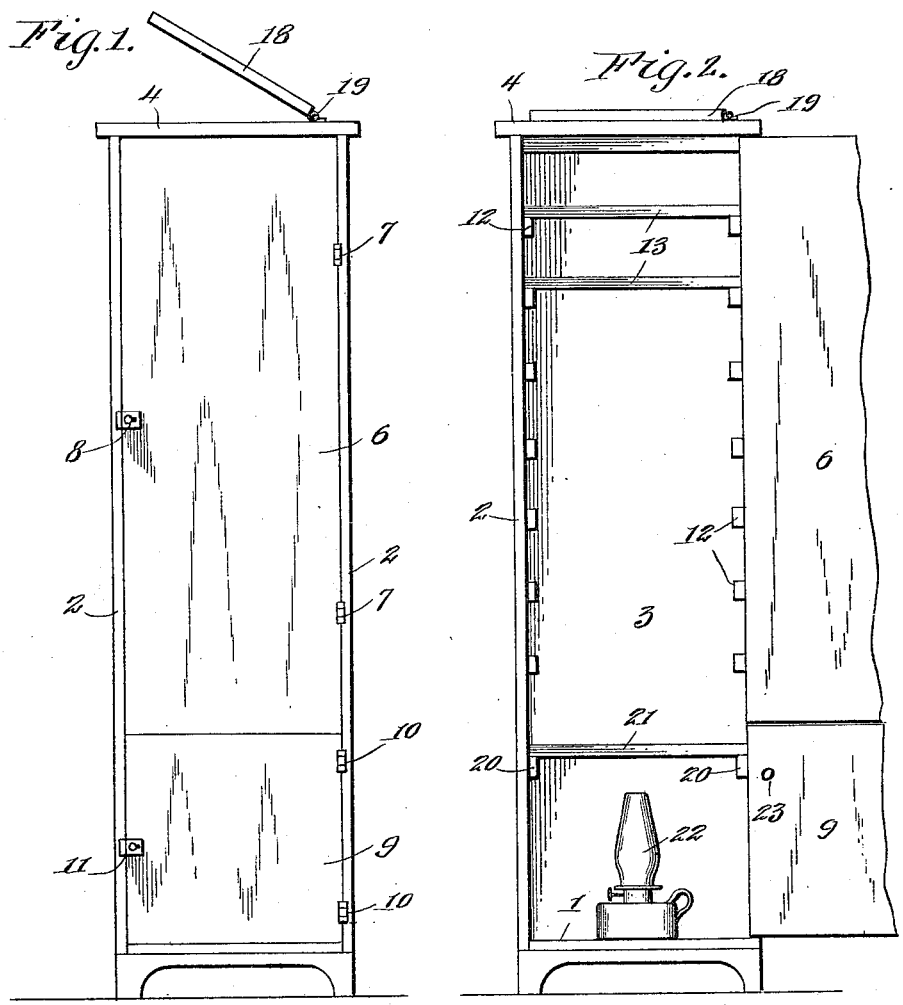

UNITED STATES PATENT OFFICE.

ELMER E. MARSHALL, OF ERIE, KANSAS.

SEED-GERMINATOR.

1,130,752. Specification of Letters Patent. Patented Mar. 9, 1915.

Application filed March 13, 1913. Serial No. 754,084.

*To all whom it may concern:*

Be it known that I, ELMER E. MARSHALL, a citizen of the United States, residing at Erie, in the county of Neosho and State of Kansas, have invented certain new and useful Improvements in Seed-Germinators, of which the following is a specification.

This invention relates to an improved seed germinator and to an apparatus for promoting the growth of sprouts, and the object of the invention is to provide simple and inexpensive means utilizing a moist bottom heat, wherewith, even under unfavorable exterior conditions, the ordinary farmer or housewife may successfully propagate the growth of grains, vegetables and other plants, as well as test seeds when so desired.

A further object of the invention contemplates the provision of suitable means for uniformly distributing moisture throughout the several trays employed in connection with the invention, the moisture finally reaching a suitable receptacle in the form of a tank where it is collected until subsequently removed.

A still further object of the invention resides in the provision of an especially devised tray upon which grain or other plant sprouts may be placed for promoting the growth thereof.

The above and additional objects are accomplished by such means as are illustrated in their preferred embodiment in the accompanying drawings, described in the following specification and then more particularly pointed out in the claim which is appended hereto and forms part of this application.

In describing my invention in detail, reference will be had to the accompanying drawings wherein like characters denote like or corresponding parts throughout the several views, and in which;

Figure 1, is a front elevation, with the cover partly raised, of a stand constructed in accordance with my invention, Fig. 2, is a similar view with the cover closed, and the doors widely open, Fig. 3, is a vertical sectional view, certain of the trays being removed, Fig. 4, is a top plan view of one of the trays, partly broken away, Fig. 5, is a fragmentary sectional view of one of the trays, and Fig. 6, is a top plan view of the water tank or receptacle.

Proceeding now to the description of the drawings wherein is illustrated the preferred form of my invention, the numeral 1 designates the base of an upright stand, having the usual sides 2 and back 3, the top 4 having an opening 5 formed therein, the purpose of which will be hereinafter fully described. The front of the stand is normally closed by means of a pair of doors, the upper and larger door 6 of which is hingedly connected as at 7 to one of the sides 2 of the stand and held or retained in closed position by means of suitable latch mechanism 8 provided therefor, while the smaller or lower door 9 is likewise hingedly connected as at 10 to the same side 2 of the stand, the said door 9 also being held in closed position by means of similar latch mechanism 11.

Upon the interior of the frame at each side thereof and spaced uniformly apart throughout the greater portion of the length of the stand, I provide a plurality of supporting strips 12, the strips upon each side of the stand being directly opposite those upon the other for evenly supporting a plurality of trays, designated in their entirety by the numeral 13. Each tray is preferably composed of a substantially square metallic frame 14 having an inwardly projecting flange 15 formed upon the lower edge thereof, the said flange 15 extending inwardly from all sides of the tray and supporting thereupon a wire mesh bottom 16, through which the water or moisture applied to the trays is free to drip. Upon the top of the wire mesh bottom 16 and entirely inclosed within the tray sides 14, a strip of coarse burlap or other absorbent material 17 is fitted, the said strip adapted to support the plant sprouts contained within the stand. By the provision of a tray constructed as above described, it will be seen that the moisture necessary to the growth of the plants is retained or absorbed by the strips 17 for thoroughly watering the sprouts resting thereupon, thereby greatly aiding and promoting the germination of the seeds. Any number of these trays may be employed in connection with the invention, provided sufficient space is left therebetween to allow unhampered growth of the sprouts supported thereby.

A door 18 is hingedly connected as at 19 to the top 4 of the stand, the said door when raised, as is clearly shown in Fig. 1 of the drawing, creating an open top by reason of the opening 5 to allow watering of the sprouts or plants contained within the stand.

Supporting strips 20, duplicates of the strips 12, are spaced from the bottom 1 of the stand and disposed oppositely upon each side thereof; the said strips adapted to support a suitable water tank or receptacle 21 removably supported thereby for receiving and collecting the drippings and moisture as it falls from the trays 13 disposed above. By the provision of the water receptacle 21, a space is left between the bottom 1 and the said receptacle, within which a lamp or other heat source 22 is adapted to fit, thereby directing the heat upon the bottom of the receptacle, and facilitating and promoting the germination of the seeds contained within the stand.

The lower door 9 is so arranged upon the stand side 2 as to allow the removal of the lamp 22 and the water receptacle or tank 21 without necessitating the opening of the upper or larger door 6, thereby preventing exposure of the seeds to the exterior conditions or the outside atmosphere often injurious thereto.

Openings 23 may be provided through the door 9 for supplying air to the interior of the heating compartment. Another opening 24 is provided through the cover 18 to allow the escape of smoke that might otherwise accumulate within the stand.

It will be seen from the above, taken in connection with the accompanying drawings that a germinator constructed in accordance with this invention is extremely simple in operation and inexpensive of manufacture; that the sprouts contained within the stand are thoroughly watered and heated in the desired manner; and that the growth thereof is greatly promoted, thereby conditioning them for subsequent outdoor planting.

It will be understood that the above description and accompanying drawings comprehend only the general and preferred embodiment of my invention and that various minor changes, proportion and arrangement of parts may be made within the scope of the appended claim, and without sacrificing any of the advantages of my invention.

Having thus fully described my invention, what I claim as new and desire to secure by Letters Patent is:

A seed germinator comprising in combination; a casing having moist heat generating means in the lower portion thereof, a plurality of perforated supporting trays positioned to closely fit the casing transversely thereof to close transmission of moist heat laterally of said trays, and devices for supporting said trays in superposed spaced relation above said generating means thereby causing the moist heat to successively pass through the contents of the trays from the lowermost to the uppermost, the said casing having an opening above the uppermost tray, as and for the purpose set forth.

In testimony whereof I affix my signature in presence of two witnesses.

ELMER E. MARSHALL.

Witnesses:
C. O. BOAZ,
C. J. BEARD.